Oct. 8, 1968  J. W. BURRIS  3,404,879
SHEET MATERIAL HANDLING APPARATUS AND METHOD
Filed July 1, 1966  2 Sheets-Sheet 1
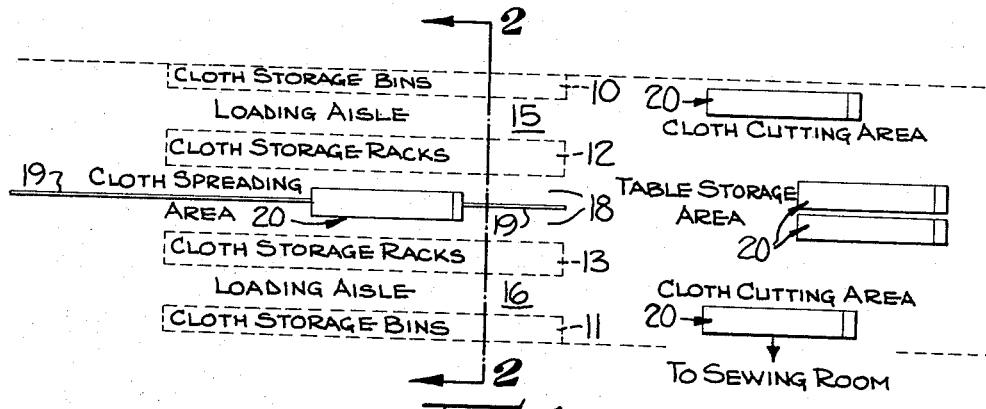
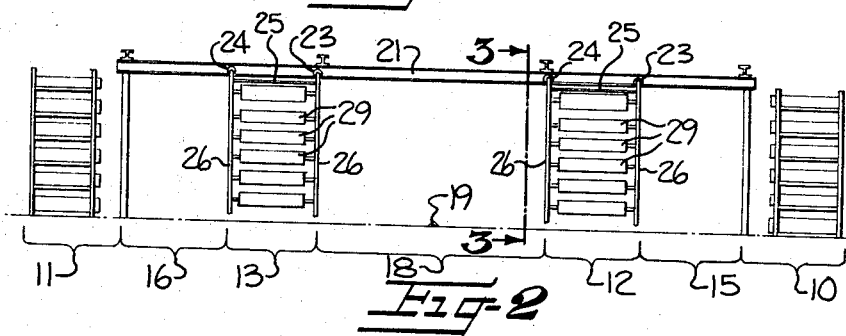
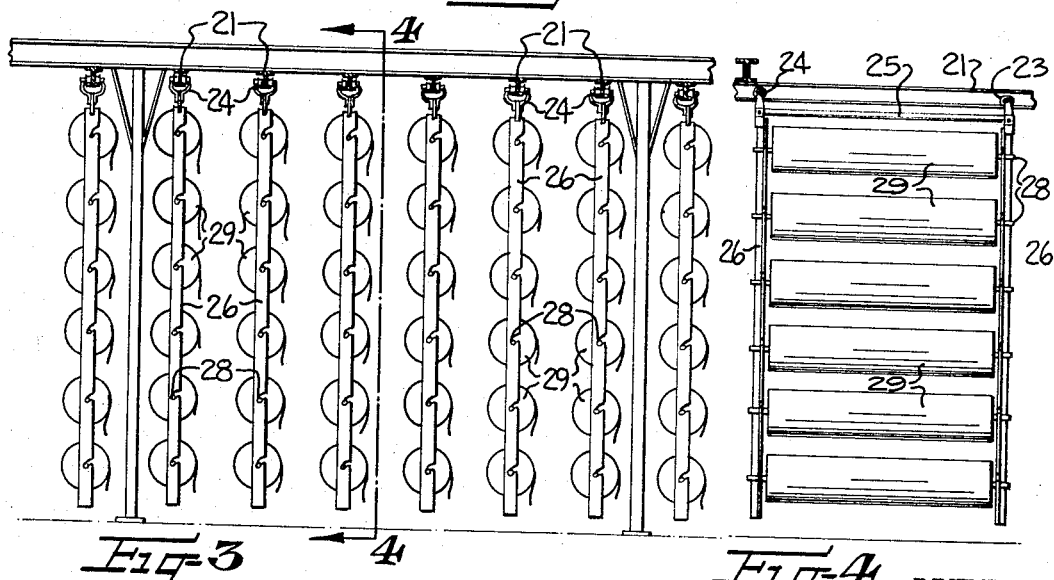
INVENTOR:
JOSEPH W. BURRIS
BY Parrott, Bell, Seltzer, Park & Heard
ATTORNEYS

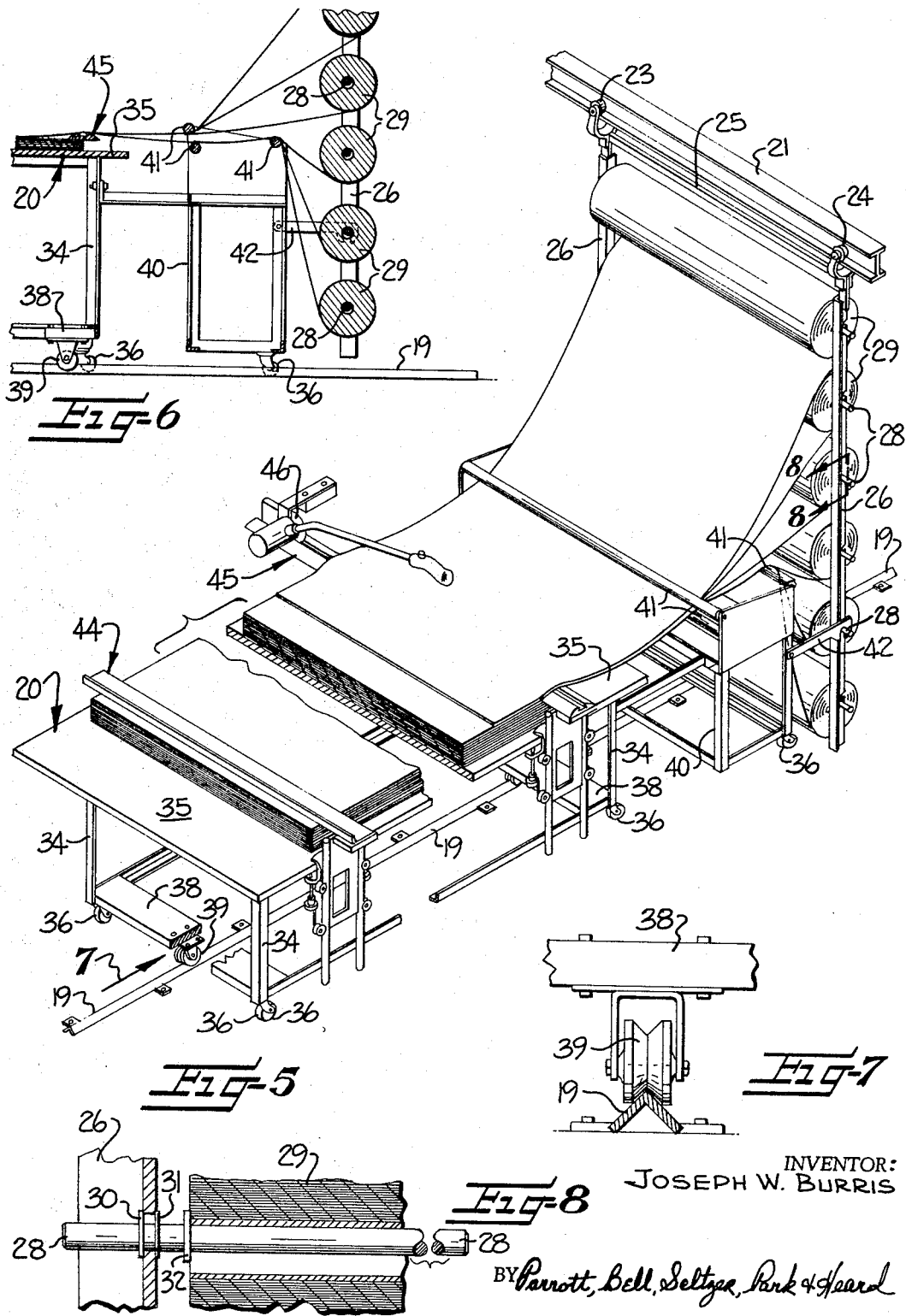

@@ -0,0 +1 @@
United States Patent Office 3,404,879
Patented Oct. 8, 1968

3,404,879
SHEET MATERIAL HANDLING APPARATUS
AND METHOD
Joseph W. Burris, Lincolnton, N.C., assignor to Burris Manufacturing Company, Lincolnton, N.C., a corporation of North Carolina
Filed July 1, 1966, Ser. No. 562,192
7 Claims. (Cl. 270—52)

ABSTRACT OF THE DISCLOSURE

A method and an apparatus for handling rolls of sheet material in preparation for patterned cutting thereof wherein a plurality of rolls of sheet material supported in a predetermined arrangement on rack structures are brought into predetermined alignment with a movable cutting table for spreading on the table at a first location and cutting after removal of the table to a remote location.

---

In many trades, such as the sewing trades, it is necessary to lay sheet material such as fabrics on the work surface of a lay-up or cutting table for patterning and cutting in accordance with the pattern. In such trades, the practice heretofore has been for the cutting table to be fixedly mounted in a work area and for a trolley or carriage to be mounted on or above the work surface of the table for movement therealong. Single rolls or bolts of the sheet material to be patterned and cut were positioned on the carriage, which was then repeatedly traversed back and forth along the table to spread layers of the sheet material on the work surface for patterning and cutting.

This traditional approach to handling sheet material in preparation for pattern cutting is extremely wasteful in both time and space, inasmuch as a large number of lay-up and cutting tables must be provided so that the progressive steps of spreading material, patterning superposed layers of material, and cutting patterned material may be simultaneously carried out at various ones of the tables. As a result of the large number of tables required for the various steps in the progressive operation to be performed simultaneously, and the large area required for the large number of tables, storage of the material cannot be readily accomplished near the point of use, and substantial time and effort is expended in handling the sheet material in preparation for patterning and cutting.

With the aforementioned difficulties in mind, it is an object of the present invention to facilitate the handling of sheet material in preparation for patterning and cutting, by providing an apparatus and method in accordance with which a lay-up and cutting table may be moved between a material spreading location and other patterning and cutting locations, so that the various steps in the progressive operation of spreading, patterning and cutting may each be carried out in separate areas to economize in the movement of operators and machines and to reduce the operating areas required.

Another object of this invention is to provide an apparatus including table guiding and rack guiding trackways, a wheeled cutting table movable into engagement with the table trackway and guided thereby to a material spreading location, and a rolled sheet material rack movable along a rack guiding trackway to the material spreading location at which material is spread on the work surface of the cutting table.

Another object of this invention is to provide a method for handling rolls of sheet material wherein the sheet material is mounted on a rack as described and a rack and movable cutting table are brought into a predetermined relationship at a material spreading location in order that material may be spread upon the table and the table subsequently moved to a patterning and cutting location as the rack is returned to a storage location.

Some of the objects and advantages of the invention having been stated, others will appear as the description proceeds, when taken in connection with the accompanying drawings, in which—

FIGURE 1 is a schematic plan view of the apparatus of this invention;

FIGURE 2 is an elevation view of a portion of the apparatus of this invention, taken substantially along the line 2—2 in FIGURE 1;

FIGURE 3 is an elevation view of a portion of the apparatus of this invention, taken substantially along the line 3—3 of FIGURE 2;

FIGURE 4 is an elevation view of a roll material rack, taken substantially along the line 4—4 in FIGURE 3;

FIGURE 5 is a perspective view of the apparatus of this invention as material is spread upon the work surface of a cutting table;

FIGURE 6 is an elevation view, in partial section, of the appartus of FIGURE 5;

FIGURE 7 is a detail view of a portion of the apparatus of FIGURE 5, taken substantially as indicated by the arrow 7 in that figure; and FIGURE 8 is a detail section view of a portion of the apparatus of FIGURE 5, taken substantially as indicated by the line 8—8 in that figure.

Referring now more specifically to the figures, the flow of sheet material comprehended by the present invention may best be described with reference to FIGURE 1, which is a schematic plan view of the arrangement of movable elements in accordance with this invention. Rolls of sheet material entering the area there shown are first placed in storage bins in the areas indicated at 10 and 11 and subsequently are removed from the bins as needed and mounted upon cloth storage racks, of a type described which are normally positioned in the areas indicated at 12 and 13 and movable into the loading aisles indicated at 15 and 16 for the mounting of rolls. The two rack storage areas 12, 13 define therebetween an alleyway 18 which serves as a cloth spreading area, as described hereinafter. A table guiding trackway 19 extends longitudinally through the cloth spreading area 18, and defines a predetermined path of movement for one of a plurality of wheeled lay-up and cutting tables 20 which may be moved into the cloth spreading area 18 and to or from cloth cutting areas and table storage areas as identified by legends in FIGURE 1.

With a cutting table 20 engaging the table guiding trackway 19 and positioned on the predetermined path extending through the cloth spreading area 18, a cloth storage rack is moved from one of the areas 12, 13 to a position adjacent one end of the work surface of table 20, as described hereinafter. Sheet material from the rolls mounted on the rack is then spread on the work surface of the table 20 until a sufficient number of layers have been spread, the rack returned to one of the rack storage areas 12, 13 and the table 20 advanced to a cutting area where patterning and cutting is done.

A more detailed understanding of the mounting, arrangement and construction of the material racks normally positioned in the storage areas 12 and 13 may be gained from FIGURES 2–5 and 8. As there shown, a plurality of flanged girders 21, functioning as rack guiding trackways, are suitably suspended above the floor to extend in predetermined parallel directions, perpendicular to the table guiding trackway 19. Suitable trolleys 23 and 24 engage each girder 21 for movement therealong and, together with a rigid horizontal spacing member 25 and a pair of depending sidebar members 26, form one of the racks. Each trackway girder 21 has at least one rack mounted for movement therealong, and preferably has a pair of racks mounted thereon as indicated in FIGURE 2.

In order to support a plurality of rolls of sheet material thereon for dispensing rotation about a respective number of parallel horizontally extending and vertically spaced apart roll axes, each of the sidebar members 26 has a plurality of notches therealong for receiving roll support rods 28, each of which penetrates a roll 29 of sheet material. In order to assure uniform spacing of the rolls 29 with respect to the vertically extending member 26 of the racks, the rods 28 preferably have a series of washers 30–32 secured thereon. One pair of washers 30, 31 are spaced to secure the rod 28 against axial movement with respect to the vertical members 26 of the rack, while another washer 32 engages one end of the roll 29 to determine the lateral spacing of the roll with respect to the vertical members 26 of the rack.

Due to the relationship of the roll axes as determined by the rods 28 and the rack movement as determined by the trackway girders 21 and the trolleys 23 and 24, the sheet material rolls mounted on a rack in a loading aisle area such as 15 and 16 are readily stored in the rack storage areas 12 and 13 and movable to a material spreading location in the center aisle area 18. During such movement and when in such locations, the orientation of the rolls is predetermined by the rack and trackway constructions and, as shown, is perpendicular to the table trackway 19.

Referring now more particularly to FIGURES 5–7, each of the lay-up tables 20 includes supporting legs 34 arranged depending from a table top 35 which provides the work surface on which sheet material is to be spread for patterning and cutting. A plurality of floor engaging wheels or casters 36 are mounted on the legs 34 to permit free movement of the lay-up table 20, and frame cross-members 38 have grooved wheels 39 fixed thereto for engaging the table guiding trackway 19. Preferably, the table guiding trackway 19 is formed by an inverted angle iron (FIGURE 7) secured to the floor in the cloth spreading area 18. Inasmuch as at least two grooved rollers 39 are provided for engaging the table trackway 19, the lay-up table 20 is guided thereby for movement along a predetermined path and held in a predetermined relationship.

Adjacent one end of the wheeled lay-up table 20 is a sub-frame 40 (FIGURE 6) secured to the framework of the lay-up table 20 and including a plurality of horizontally extending sheet material guide rollers 41. Additionally, the sub-frame 40 includes a pair of pivotally attached latch members 42, for purposes to be described more fully hereinafter. Adjacent the table top 35 are provided sheet material hold down bars indicated at 44 and 45, suitably mounted on the top 35 of the table for vertical movement, so as to clampingly engage the ends of lengths of sheet material spread on the work surface of the table 20, as described more fully hereinafter.

In operation of the apparatus as described above, and in practice of the method as comprehended by the present invention, a lay-up table 20 is moved into engagement with the table guiding trackway 19 and to a material spreading location. At the material spreading location, an associated rack is moved along the rack guiding trackway 21 to a predetermined position at which the axes of the rolls 29 are adjacent the sub-frame 40 at one extremity of the lay-up table 20, with the axes of the rolls 29 as determined by the rods 28 perpendicular to the lengthwise axis of the work surface of the table. Then, the latch members 42 on the sub-frame 40 are brought into engagement with the exposed extremities of one of the rods 28, to lock the selected rack and the lay-up table in the desired relative position, with the rolls of sheet material extending substantially across the central portion of the work surface of the table.

Thereafter, an operator may grasp one or more of the lengths of sheet material made available by the plurality of rolls on the rack so positioned, thread the sheet materials through the guide rollers 41 and simultaneously lay a plurality of layers on the work surface of the lay-up table 20 by pulling the material from the rolls and along the lengthwise axis of the table. Preferably, and in order to fully realize the economies contemplated by this invention, material is dispensed from a plurality of rolls 29 and guided by the guide rollers 41 on converging paths so as to be superposed in a plurality of layers as the material is advanced over the work surface (FIGURE 6). As the material is positioned in the desired manner, the free end is clamped beneath the clamp member 44 and a suitable power driven material cutter indicated at 46 is used to sever the length of material spread upon the work surface from that retained upon the storage rolls 29. Lay-up may then be continued from the rolls at hand or other rolls may be selected from the various racks retained in the rack storage areas 12 and 13 to complete the lay-up of as many layers as are desired on the table 20 before the table is removed from the table guiding trackway 19 and to a patterning and cutting area as indicated in FIGURE 1.

In the drawings and specification, there has been set forth a preferred embodiment of the invention, and although specific terms are employed, they are used in a generic and descriptive sense only and not for purposes of limitation, the scope of the invention being defined in the claims.

I claim:

1. Apparatus for facilitating the handling of rolled sheet material in preparation for pattern cutting thereof comprising:

a plurality of rolls of sheet material, a table guiding trackway, a wheeled cutting table engaging said table trackway for movement therealong on a predetermined path to one of a plurality of material spreading locations and having an elongate work surface for receiving sheet material spread thereon for patterning and cutting, said table being movable out of engagement with said table trackway and to a location remote therefrom for patterning and cutting of material spread thereon, a plurality of rack guiding trackways corresponding in number to said plurality of material spreading locations, a plurality of racks, each engaging one of said rack trackways for movement therealong on a predetermined path between one of said material spreading locations and a location remote therefrom and to one side of said table trackway and including means for supporting a plurality of said rolls of sheet material for dispensing rotation about a plurality of parallel horizontally extending and vertically spaced apart roll axes, means carried by each of said racks for positioning the plurality of rolls supported thereon with the edges thereof in predetermined overlying relationship, and means carried by said table for engaging any of said racks when at said material spreading location and for positioning an engaged rack with the edges of said rolls supported thereon in predetermined alignment with said work surface, said predetermined paths of said table and racks and the orientation thereof being such that a rack at one of said material spreading locations is disposed relative to said table at such location with said roll axes adjacent one end of said work surface and perpendicular to the lengthwise axis thereof so that sheet material in said rolls may be readily spread on said work surface.

2. Apparatus as claimed in claim 1 wherein said table trackway is floor mounted and defines a straight path for movement of said table and wherein said racks define a table alleyway adjacent said table trackway when at said remote location.

3. Apparatus as claimed in claim 2 wherein said racks are pendently mounted from said rack trackways and each rack trackway has two racks mounted thereon, each pair of racks mounted on a corresponding trackway being separated by said table alleyway when at their respective remote locations.

4. Apparatus as claimed in claim 3 wherein said rack trackways define a plurality of parallel straight paths for movement of said racks and wherein said rack movement paths are perpendicular to said table movement path at the intersection thereof.

5. A method of handling rolls of sheet material in preparation for pattern cutting thereof comprising:

supporting a plurality of rolls of sheet material on a plurality of racks for dispensing rotation about a plurality of parallel horizontally extending and vertically spaced apart roll axes and with at least one edge of each of said rolls positioned in predetermined alignment to the rack supporting the same, then moving a wheeled cutting table having an elongate work surface along a table guiding trackway to a material spreading location and moving one of the racks along a respective rack guiding trackway to the spreading location and to a position wherein the axes of the rolls of sheet material supported thereon are adjacent one end of the work surface of the table and perpendicular to the lengthwise axis thereof, then latching the one rack and the table together with the at least one edge of the rolls in predetermined alignment with the work surface, then spreading sheet material from the rolls lengthwise along the work surface, then severing the sheet material spread on the work surface from any material retained on the roll, and thereafter moving the one rack along the rack trackway from the spreading location to a remote storage location and moving the table out of engagement with the table trackway and from the spreading location to a pattern cutting location remote therefrom.

6. A method as claimed in claim 5 wherein the table and rack are moved along perpendicular straight line paths to and from the spreading location.

7. A method as claimed in claim 5 wherein the step of spreading includes dispensing sheet material from a plurality of rolls, guiding the sheet material from the rolls along converging paths intermediate the one rack and the work surface to superpose the same in a plurality of layers, and advancing the superposed layers along the work surface.

References Cited
UNITED STATES PATENTS

| | | | |
|---|---|---|---|
| 426,174 | 4/1890 | Doerflinger | 242—55.3 |
| 829,527 | 8/1906 | Holmes | 312—132 |
| 1,389,906 | 9/1921 | Segal | 270—30 |
| 1,436,171 | 11/1922 | Hirt | 104—91 |
| 2,633,809 | 4/1953 | Robinson et al. | 104—48 |
| 2,921,688 | 1/1960 | Riemenschneider | 242—55.3 X |
| 3,088,786 | 5/1963 | Snethen | 312—235 X |
| 3,255,897 | 6/1966 | Lacy et al. | 104—91 X |

EUGENE R. CAPOZIO, *Primary Examiner.*

P. V. WILLIAMS, *Assistant Examiner.*